United States Patent
Wang

(10) Patent No.: US 10,292,052 B2
(45) Date of Patent: May 14, 2019

(54) ACCESS METHOD AND DEVICE

(71) Applicant: Huawei Technologies Co., Ltd., Shenzhen (CN)

(72) Inventor: Bin Wang, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 42 days.

(21) Appl. No.: 15/582,039

(22) Filed: Apr. 28, 2017

(65) Prior Publication Data
US 2017/0238187 A1   Aug. 17, 2017

Related U.S. Application Data

(63) Continuation of application No. PCT/CN2014/090115, filed on Oct. 31, 2014.

(51) Int. Cl.
| | |
|---|---|
| H04W 16/10 | (2009.01) |
| H04W 72/04 | (2009.01) |
| H04L 12/26 | (2006.01) |
| H04W 72/02 | (2009.01) |

(52) U.S. Cl.
CPC ......... *H04W 16/10* (2013.01); *H04L 43/0888* (2013.01); *H04W 72/02* (2013.01); *H04W 72/04* (2013.01); *H04W 72/0413* (2013.01); *Y02D 70/00* (2018.01); *Y02D 70/1262* (2018.01)

(58) Field of Classification Search
CPC . H04W 16/10; H04W 72/02; H04W 72/0413; H04W 72/04; H04L 43/0888; Y02D 70/1262; Y02D 70/00
See application file for complete search history.

(56) References Cited

U.S. PATENT DOCUMENTS

| | | | |
|---|---|---|---|
| 7,542,733 B1 | 6/2009 | Ngan | |
| 2011/0243048 A1* | 10/2011 | Wang | H04L 5/0051 370/311 |
| 2013/0279376 A1* | 10/2013 | Ahmadi | H04W 72/04 370/277 |

(Continued)

FOREIGN PATENT DOCUMENTS

| | | |
|---|---|---|
| CN | 1901398 A | 1/2007 |
| CN | 101466106 A | 6/2009 |

(Continued)

*Primary Examiner* — Walli Z Butt
(74) *Attorney, Agent, or Firm* — Slater Matsil, LLP

(57) ABSTRACT

Embodiments provide an access method and device. The method includes: sending, by a user terminal, a carrier extension request to a base station when a current service resource demand is greater than a specified threshold, where the carrier extension request is used to request the base station to allocate an available spectrum resource; receiving the available spectrum resource sent by the base station. The method also includes obtaining through calculation, according to the current service resource demand and the available spectrum resource, a quantity of antenna channels that need to be enabled, and enabling an antenna channel corresponding to the quantity of antenna channels. The method also includes sending an access request to the base station, where the access request carries the antenna channel that is to be enabled by the user terminal.

20 Claims, 3 Drawing Sheets

(56) References Cited

U.S. PATENT DOCUMENTS

| | | | |
|---|---|---|---|
| 2013/0286960 A1* | 10/2013 | Li ................. | H04W 72/042 |
| | | | 370/329 |
| 2014/0093012 A1 | 4/2014 | Zhang et al. | |
| 2015/0341863 A1 | 11/2015 | Zhang et al. | |
| 2015/0341930 A1* | 11/2015 | Fitch ............... | H04W 16/14 |
| | | | 455/514 |
| 2015/0373554 A1* | 12/2015 | Freda ............... | H04W 16/14 |
| | | | 455/450 |

FOREIGN PATENT DOCUMENTS

| | | |
|---|---|---|
| CN | 101711032 A | 5/2010 |
| CN | 102378321 A | 3/2012 |
| CN | 102917456 A | 2/2013 |
| CN | 102918780 A | 2/2013 |
| CN | 102958182 A | 3/2013 |
| CN | 103648101 A | 3/2014 |
| CN | 103974340 A | 8/2014 |
| WO | 2014012244 A1 | 1/2014 |

* cited by examiner

ACCESS METHOD AND DEVICE

CROSS-REFERENCE TO RELATED APPLICATIONS

This application is a continuation of International Application No. PCT/CN2014/090115, filed on Oct. 31, 2014, the disclosure of which is hereby incorporated by reference in its entirety.

TECHNICAL FIELD

The present invention relates to the field of wireless communications technologies, and in particular, to an access method and device.

BACKGROUND

With development of wireless communications technologies, various wireless application requirements increase rapidly, and spectrum resources attracts ever-increasing attention. A static spectrum allocation strategy used in a current stage causes low spectrum resource utilization.

Recently, a secondary use method of a "licensed frequency band" draws extensive attention, and is an effective way to implement dynamic spectrum access (DSA for short). The dynamic spectrum access means that a secondary user terminal detects an available spectrum hole by spectrum sensing, and accesses a spectrum in a manner of opportunistic access. The secondary user terminal refers to an unlicensed user terminal.

When accessing a network, the secondary user terminal usually uses a preset subcarrier mode. In this way, the user terminal enables all or most of antenna channels according to the preset subcarrier mode, and accesses the network by using enabled antenna channels. However, in this case, the enabled antenna channels are far more than a service requirement, thereby easily causing a waste of the spectrum resources.

SUMMARY

In view of this, embodiments of the present invention provide an access method and device, to resolve a current existing problem of a waste of spectrum resources during dynamic spectrum access used by a secondary user terminal.

According to a first aspect of the embodiments of the present invention, an access method is provided. The method includes sending, by a user terminal, a carrier extension request to a base station when a current service resource demand is greater than a specified threshold, where the carrier extension request is used to request the base station to allocate an available spectrum resource. The method also includes receiving, by the user terminal, the available spectrum resource sent by the base station. The method also includes obtaining through calculation, by the user terminal according to the current service resource demand and the available spectrum resource, a quantity of antenna channels that need to be enabled, and enabling an antenna channel corresponding to the quantity of antenna channels. The method also includes sending, by the user terminal, an access request to the base station, where the access request carries the antenna channel that is to be enabled by the user terminal.

With reference to the first of the embodiments of the present invention, in a first possible implementation manner, that the user terminal determines the current service resource demand includes: determining, by the user terminal, a service throughput rate of a current service in a specified period, where the service throughput rate is used to represent an amount of data transmitted between the user terminal and the base station per unit of time; and the sending, by a user terminal, a carrier extension request to a base station includes: sending, by the user terminal, the carrier extension request to the base station when it is determined that the service throughput rate is greater than the specified threshold.

With reference to the first possible implementation manner of the first aspect of the embodiments of the present invention, in a second possible implementation manner, the obtaining through calculation, by the user terminal according to the current service resource demand and the available spectrum resource, a quantity of antenna channels that need to be enabled includes: obtaining through calculation, by the user terminal according to the service throughput rate and a maximum bandwidth of the available spectrum resource, a minimum quantity of antenna channels that need to be enabled; and the enabling, by the user terminal, an antenna channel corresponding to the quantity of antenna channels includes: enabling, by the user terminal, the antenna channel according to the minimum quantity, obtained through calculation, of antenna channels that need to be enabled.

With reference to the possible implementation manner of the first aspect of the embodiments of the present invention, or the first possible implementation manner of the first aspect of the embodiments of the present invention, or the second possible implementation manner of the first aspect of the embodiments of the present invention, in a third possible implementation manner, the method further includes: sending, by the user terminal, an available spectrum resource release request to the base station when the service is completed, where the available spectrum resource release request is used to request the base station to release the allocated available spectrum resource.

With reference to the possible implementation manner of the first aspect of the embodiments of the present invention, or the first possible implementation manner of the first aspect of the embodiments of the present invention, or the second possible implementation manner of the first aspect of the embodiments of the present invention, or the third possible implementation manner of the first aspect of the embodiments of the present invention, in a fourth possible implementation manner, the method further includes: starting, by the user terminal, a timer when the current service resource demand is less than or equal to the specified threshold, where the timer is used to trigger, when a specified time expires, the user terminal to determine whether to send the carrier extension request to the base station.

According to a second aspect of the embodiments of the present invention, an access device is provided. The access device includes a sending module, configured to send a carrier extension request to a base station when a current service resource demand is greater than a specified threshold, where the carrier extension request is used to request the base station to allocate an available spectrum resource. The access device also includes a receiving module, configured to receive the available spectrum resource sent by the base station; an antenna enablement module, configured to obtain through calculation, according to the current service resource demand and the available spectrum resource, a quantity of antenna channels that need to be enabled, and enable an antenna channel corresponding to the quantity of antenna channels. The access device also includes an access module, configured to send an access request to the base station, where the access request carries the antenna channel that is to be enabled by the user terminal.

With reference to a possible implementation manner of the second aspect of the embodiments of the present invention, in a first possible implementation manner, the sending module that determines the current service resource demand is specifically configured to: determine a service throughput rate of a current service in a specified period, where the service throughput rate is used to represent an amount of data transmitted between the user terminal and the base station per unit of time; and the sending module that sends the carrier extension request to the base station is specifically configured to: send the carrier extension request to the base station when it is determined that the service throughput rate is greater than the specified threshold.

With reference to the first possible implementation manner of the second aspect of the embodiments of the present invention, in a second possible implementation manner, the antenna enablement module that obtains through calculation, according to the current service resource demand and the available spectrum resource, the quantity of antenna channels that need to be enabled is specifically configured to: obtain through calculation, according to the service throughput rate and a maximum bandwidth of the available spectrum resource, a minimum quantity of antenna channels that need to be enabled; and the antenna enablement module that enables the antenna channel corresponding to the quantity of antenna channels is specifically configured to: enable the antenna channel according to the minimum quantity, obtained through calculation, of antenna channels that need to be enabled.

With reference to the possible implementation manner of the second aspect of the embodiments of the present invention, or the first possible implementation manner of the second aspect of the embodiments of the present invention, or the second possible implementation manner of the second aspect of the embodiments of the present invention, in a third possible implementation manner, the access device further includes: sending, by the user terminal, an available spectrum resource release request to the base station when the service is completed, where the available spectrum resource release request is used to request the base station to release the allocated available spectrum resource.

With reference to the possible implementation manner of the second aspect of the embodiments of the present invention, or the first possible implementation manner of the second aspect of the embodiments of the present invention, or the second possible implementation manner of the second aspect of the embodiments of the present invention, or the third possible implementation manner of the second aspect of the embodiments of the present invention, in a fourth possible implementation manner, the access device further includes a timing starting module, where: the timing starting module is configured to start a timer when the current service resource demand is less than or equal to the specified threshold, where the timer is used to trigger, when a specified time expires, the user terminal to determine whether to send the carrier extension request to the base station.

According to a third aspect of the embodiments of the present invention, an access device is provided. The access device includes a signal transmitter, a processor, and a signal receiver. The signal transmitter is configured to send a carrier extension request to a base station when a current service resource demand is greater than a specified threshold, where the carrier extension request is used to request the base station to allocate an available spectrum resource. The signal receiver is configured to receive the available spectrum resource sent by the base station. The processor is configured to obtain through calculation, according to the current service resource demand and the available spectrum resource, a quantity of antenna channels that need to be enabled, and enable an antenna channel corresponding to the quantity of antenna channels. The signal transmitter is further configured to send an access request to the base station, where the access request carries the antenna channel that is to be enabled by the user terminal.

With reference to a possible implementation manner of the third aspect of the embodiments of the present invention, in a first possible implementation manner, the processor that determines the current service resource demand is specifically configured to: determine a service throughput rate of a current service in a specified period, where the service throughput rate is used to represent an amount of data transmitted between the user terminal and the base station per unit of time; and the signal transmitter that sends the carrier extension request to the base station is specifically configured to: send the carrier extension request to the base station when it is determined that the service throughput rate is greater than the specified threshold.

With reference to the first possible implementation manner of the third aspect of the embodiments of the present invention, in a second possible implementation manner, the processor that obtains through calculation, according to the current service resource demand and the available spectrum resource, the quantity of antenna channels that need to be enabled is specifically configured to: obtain through calculation, according to the service throughput rate and a maximum bandwidth of the available spectrum resource, a minimum quantity of antenna channels that need to be enabled; and the processor that enables the antenna channel corresponding to the quantity of antenna channels is specifically configured to: enable the antenna channel according to the minimum quantity, obtained through calculation, of antenna channels that need to be enabled.

With reference to the possible implementation manner of the third aspect of the embodiments of the present invention, or the first possible implementation manner of the third aspect of the embodiments of the present invention, or the second possible implementation manner of the third aspect of the embodiments of the present invention, in a third possible implementation manner, the signal transmitter is further configured to: send an available spectrum resource release request to the base station when the service is completed, where the available spectrum resource release request is used to request the base station to release the allocated available spectrum resource.

With reference to the possible implementation manner of the third aspect of the embodiments of the present invention, or the first possible implementation manner of the third aspect of the embodiments of the present invention, or the second possible implementation manner of the third aspect of the embodiments of the present invention, or the third possible implementation manner of the third aspect of the embodiments of the present invention, in a fourth possible implementation manner, the processor is further configured to: start a timer when the current service resource demand is less than or equal to the specified threshold, where the timer is used to trigger, when a specified time expires, the user terminal to determine whether to send the carrier extension request to the base station.

Beneficial effects are as follows.

In the embodiments of the present invention, when a current service resource demand is greater than a specified threshold, a user terminal sends a carrier extension request to a base station, where the carrier extension request is used to request the base station to allocate an available spectrum resource; receives the available spectrum resource sent by the base station; obtains through calculation, according to the current service resource demand and the available spectrum resource, a quantity of antenna channels that need to be enabled, and enables an antenna channel corresponding to the quantity of antenna channels; and sends an access request to the base station, where the access request carries the antenna channel that is to be enabled by the user terminal. The user terminal requests the available spectrum resource from the base station according to the current service resource demand, so that the base station performs resource scheduling with effectively reduced complexity, and resource scheduling becomes fairer. In addition, the user terminal obtains through calculation, according to the current service resource demand and the available spectrum resource, the quantity of antenna channels that need to be enabled, and enables an appropriate antenna channel, thereby reducing power consumption of an antenna system of the user terminal when a service requirement is met, and saving energy.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION OF ILLUSTRATIVE EMBODIMENTS

The following describes the embodiments of the present invention in detail with reference to accompanying drawings. Apparently, the described embodiments are merely some but not all of the embodiments of the present invention. All other embodiments obtained by persons of ordinary skill in the art based on the embodiments of the present invention without creative efforts shall fall within the protection scope of the present invention.

Embodiment 1

Figure 1:
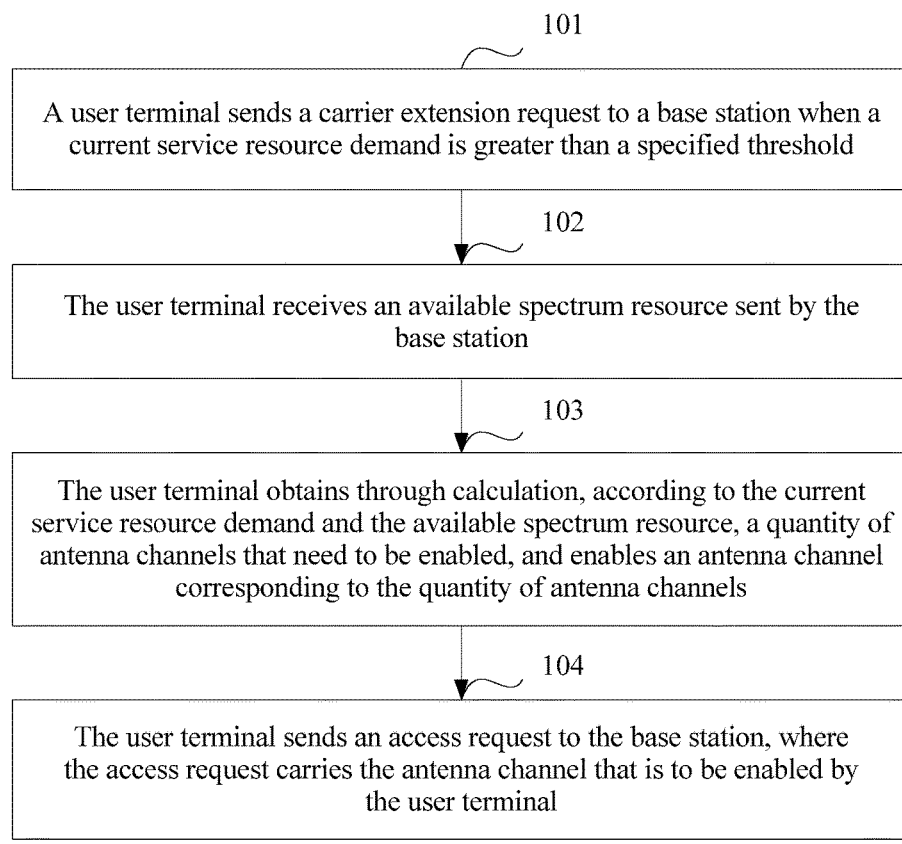
FIG. 1 is a schematic flowchart of an access method according to Embodiment 1 of the present invention.

As shown in FIG. 1, FIG. 1 is a schematic flowchart of an access method according to Embodiment 1 of the present invention. The method may be described as follows.

Step 101: A user terminal sends a carrier extension request to a base station when a current service resource demand is greater than a specified threshold.

The carrier extension request is used to request the base station to allocate an available spectrum resource.

In step 101, the user terminal pre-estimates the current service resource demand. For example, the user terminal pre-estimates a time required to complete a current service and a service throughput rate for performing the current service.

The service throughput rate is used to represent an amount of data transmitted between the user terminal and the base station per unit of time.

The user terminal sends the carrier extension request to the base station when it is determined that the estimated service throughput rate is greater than the specified threshold.

For example, a current service is downloading an application (100M) from a network side, and the user terminal pre-estimates a service throughput rate for currently performing the downloading service, such as a service throughput rate of 100 Kbit/s.

The pre-estimated service throughput rate is compared with the specified threshold. When the pre-estimated service throughput rate is greater than the specified threshold, it indicates that spectrum resources allocated to the user terminal are relatively strained, and an available spectrum resource needs to be requested from the base station, so as to meet a requirement for downloading the current service. In this case, the carrier extension request is sent to the base station.

In this way, the user terminal sends the carrier extension request to the base station according to a resource demand of the user terminal, so that the base station performs resource scheduling according to a user terminal requirement, and resource scheduling becomes fairer and less complex. Wasting resulting from allocating more resources to some user terminals and uneven resource allocation resulting from allocating a fewer resources to some user terminals are avoided.

When the pre-estimated service throughput rate is not greater than the specified threshold, it indicates that spectrum resources allocated to the user terminal are relatively sufficient, and a requirement for downloading the current service can be met. In this case, the user terminal stops channel measurement of an extended carrier, thereby saving energy consumption of the user terminal.

It should be noted that a value of the specified threshold may be set according to different services, or may be set according to an actual requirement. The value of the specified threshold is not limited herein.

Step 102: The user terminal receives an available spectrum resource sent by the base station.

In step 102, when receiving the carrier extension request sent by the user terminal, the base station determines a spectrum resource that is in an idle state or that can be allocated to the user terminal, and sends, to the user terminal, the determined spectrum resource that is used as the available spectrum resource.

The available spectrum resource may include at least one of a quantity of available extended carriers, a bandwidth of the available spectrum resource, a frequency channel number, a center frequency of the available spectrum resource, or the like.

Step 103: The user terminal obtains through calculation, according to the current service resource demand and the available spectrum resource, a quantity of antenna channels that need to be enabled, and enables an antenna channel corresponding to the quantity of antenna channels.

In step 103, when receiving the available spectrum resource sent by the base station, the user terminal obtains through calculation, according to the current service resource demand and the bandwidth of the available spectrum resource, the quantity of antenna channels that need to be enabled.

Specifically, the quantity of antenna channels that need to be enabled is obtained through calculation according to the service throughput rate of the current service and the bandwidth of the available spectrum resource.

When the service throughput rate remains unchanged, using a greater bandwidth saves more energy than using more antennas and radio frequency channels.

A commercial TRX chip 2.4 GHz, TDD LTE DL is used as an example. As shown in Table 1, Table 1 shows a relationship among bandwidth, an antenna channel, and energy consumption.

TABLE 1

| Channel/bandwidth | Consumed current | Theoretical DL rate |
|---|---|---|
| 2 RX/40 MHz | 445 × 2 = 890 mA | 200 Mbps |
| 4 RX/20 MHz | 390 × 4 = 1560 mA | 200 Mbps |

It may be learned from Table 1 that, when the service throughput rate is 200 Mbps, if the bandwidth is 40 MHz and two antenna channels are enabled, the consumed current is 890 mA; or if the bandwidth is 20 MHz and four antenna channels are enabled, the consumed current is 1560 mA.

If only power consumption of the TRX chip is calculated, power consumption in the 2 RX/40 MHz mode is only 57% of power consumption in the 4 RX/20 MHz mode. If peripheral circuit current consumption is taken into consideration, saved power consumption may reach 50%.

That is, when the service throughput rate remains unchanged, a greater bandwidth results in a fewer enabled antenna channels, and less energy consumption.

Specifically, the user terminal obtains through calculation, according to the estimated service throughput rate and a maximum bandwidth of the available spectrum resource, a minimum quantity of antenna channels that need to be enabled; and enables the antenna channel according to the minimum quantity, obtained through calculation, of antenna channels that need to be enabled.

Step 104: The user terminal sends an access request to the base station, where the access request carries the antenna channel that is to be enabled by the user terminal.

In step 104, the user terminal sends the access request that carries the enabled antenna channel to the base station, so that the base station determines, according to the antenna channel enabled by the user terminal, a transmission resource for communication with the user terminal, and establishes a communications connection with the user terminal by using the transmission resource.

Optionally, the method further includes: sending, by the user terminal, an available spectrum resource release request to the base station when the service is completed.

The available spectrum resource release request is used to request the base station to release the allocated available spectrum resource.

Optionally, the method further includes: starting, by the user terminal, a timer when the current service resource demand is less than or equal to the specified threshold, where the timer is used to trigger, when a specified time expires, the user terminal to determine whether to send the carrier extension request to the base station.

The user terminal may monitor the current service resource demand periodically or a periodically. When the current service resource demand is less than or equal to the specified threshold, or after the user terminal releases the available spectrum resource allocated by the base station, the user terminal may immediately determine whether to initiate the carrier extension request to the base station, or the user terminal may start the timer, and determine, when the specified time of the timer expires, whether to initiate the carrier extension request to the base station.

For example, after the user terminal releases the available spectrum resource allocated by the base station, or when the current service resource demand is less than or equal to the specified threshold, the user terminal starts the timer, and stops channel measurement of the available spectrum resource.

In this way, a carrier extension timer is used not only to prevent one user terminal from occupying a spectrum resource for a long time, improving fairness of spectrum resource usage, but also to discover in a timely manner whether a user terminal needs to apply for an extra spectrum resource, improving service execution efficiency.

By using the solutions in Embodiment 1 of the present invention, when a current service resource demand is greater than a specified threshold, a user terminal sends a carrier extension request to the base station. The carrier extension request is used to request the base station to allocate an available spectrum resource; receives the available spectrum resource sent by the base station; obtains through calculation, according to the current service resource demand and the available spectrum resource, a quantity of antenna channels that need to be enabled, and enables an antenna channel corresponding to the quantity of antenna channels; and sends an access request to the base station. The access request carries the antenna channel that is to be enabled by the user terminal. The user terminal requests the available spectrum resource from the base station according to the current service resource demand, so that the base station performs resource scheduling with effectively reduced complexity, and resource scheduling becomes fairer. In addition, the user terminal obtains through calculation, according to the current service resource demand and the available spectrum resource, the quantity of antenna channels that need to be enabled, and enables an appropriate antenna channel, thereby reducing power consumption of an antenna system of the user terminal when a service requirement is met, and saving energy.

Embodiment 2

Figure 2:
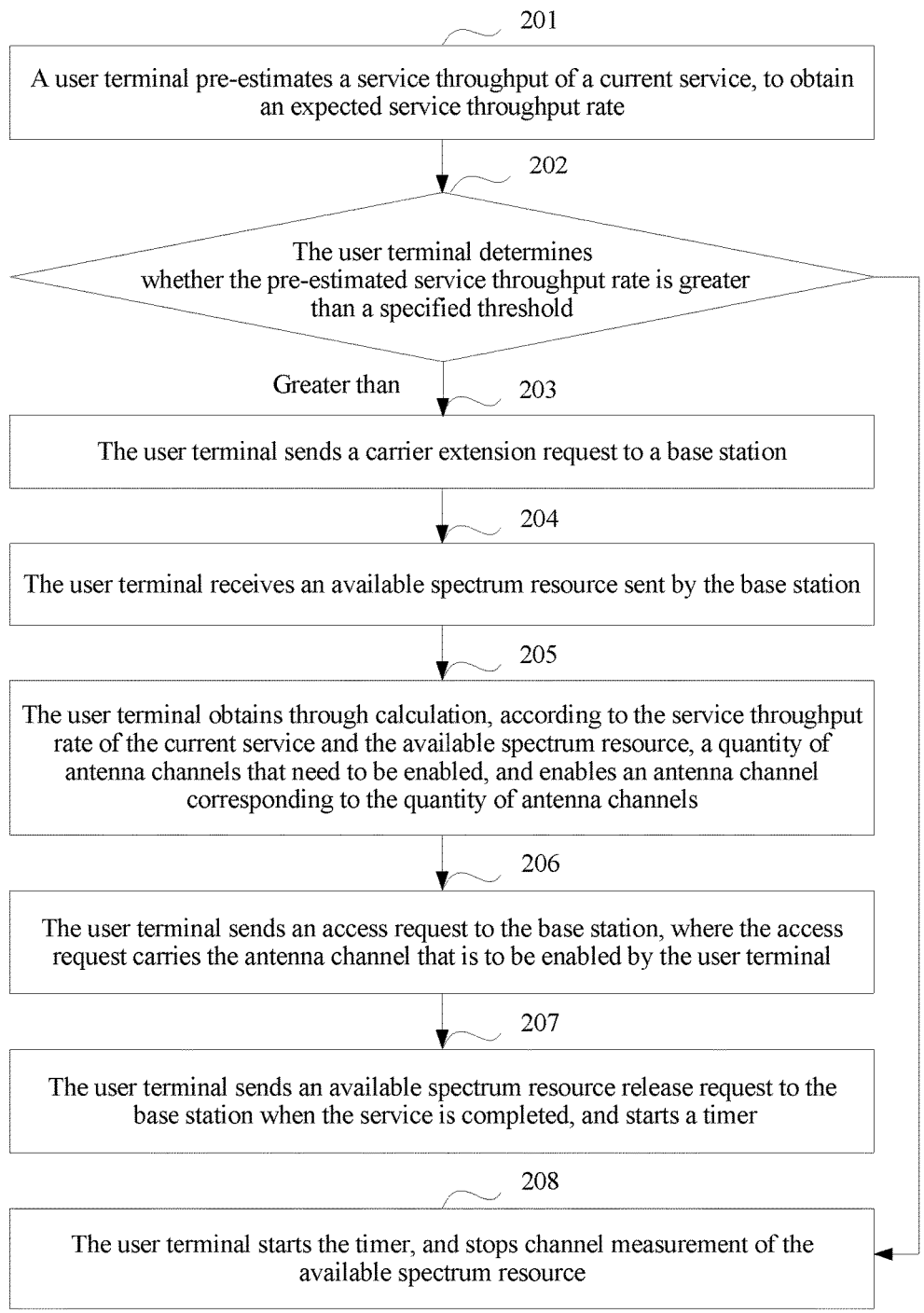
FIG. 2 is a schematic flowchart of an access method according to Embodiment 2 of the present invention.

As shown in FIG. 2, FIG. 2 is a schematic flowchart of an access method according to Embodiment 2 of the present invention. The method may be described as follows.

Step 201: A user terminal pre-estimates a service throughput of a current service, to obtain an expected service throughput rate.

The service throughput rate is used to represent an amount of data transmitted between the user terminal and a base station per unit of time.

Step 202: The user terminal determines whether the pre-estimated service throughput rate is greater than a specified threshold. If the pre-estimated service throughput rate is greater than the specified threshold, execute step 203. Otherwise, execute step 208.

Step 203: The user terminal sends a carrier extension request to a base station.

The carrier extension request is used to request the base station to allocate an available spectrum resource.

In step 203, when the pre-estimated service throughput rate is greater than the specified threshold, it indicates that spectrum resources allocated to the user terminal are relatively strained, and an available spectrum resource needs to be requested from the base station, so as to meet a requirement for downloading a current service. In this case, the carrier extension request is sent to the base station.

In this way, the user terminal sends the carrier extension request to the base station according to a resource demand of the user terminal, so that the base station performs resource scheduling according to a user terminal requirement, and resource scheduling becomes fairer and less complex. Wasting resulting from allocating more resources to some user terminals and uneven resource allocation resulting from allocating a fewer resources are allocated to some user terminals are avoided.

Step 204: The user terminal receives an available spectrum resource sent by the base station.

The available spectrum resource may include at least one of a quantity of available extended carriers, a bandwidth of the available spectrum resource, a frequency channel number, a center frequency of the available spectrum resource, or the like.

In step 204, when receiving the carrier extension request sent by the user terminal, the base station determines a spectrum resource that is in an idle state or that can be allocated to the user terminal, and sends, to the user terminal, the determined spectrum resource that is used as the available spectrum resource.

Step 205: The user terminal obtains through calculation, according to the service throughput rate of the current service and the available spectrum resource, a quantity of antenna channels that need to be enabled, and enables an antenna channel corresponding to the quantity of antenna channels.

Specifically, the user terminal obtains through calculation, according to the estimated service throughput rate and a maximum bandwidth of the available spectrum resource, a minimum quantity of antenna channels that need to be enabled; and enables the antenna channel according to the minimum quantity, obtained through calculation, of antenna channels that need to be enabled.

Step 206: The user terminal sends an access request to the base station, where the access request carries the antenna channel that is to be enabled by the user terminal.

In step 206, the user terminal sends the access request that carries the enabled antenna channel to the base station, so that the base station determines, according to the antenna channel enabled by the user terminal, a transmission resource for communication with the user terminal, and establishes a communications connection with the user terminal by using the transmission resource.

Step 207: The user terminal sends an available spectrum resource release request to the base station when the service is completed, and starts a timer.

The available spectrum resource release request is used to request the base station to release the allocated available spectrum resource.

The timer is used to trigger, when a specified time expires, the user terminal to determine whether to send the carrier extension request to the base station.

Step 208: The user terminal starts the timer, and stops channel measurement of the available spectrum resource.

In step 208, when the pre-estimated service throughput rate is not greater than the specified threshold, it indicates that spectrum resources allocated to the user terminal are relatively sufficient, and a requirement for downloading a current service can be met. In this case, the user terminal stops channel measurement of an extended carrier, thereby saving energy consumption of the user terminal.

It should be noted that a value of the specified threshold may be set according to different services, or may be set according to an actual requirement. The value of the specified threshold is not limited herein.

By using the solutions in Embodiment 2 of the present invention, a user terminal requests an available spectrum resource from a base station according to a current service resource demand, so that the base station performs resource scheduling with effectively reduced complexity, and resource scheduling becomes fairer. In addition, the user terminal obtains through calculation, according to the current service resource demand and a bandwidth of the available spectrum resource, a quantity of antenna channels that need to be enabled, and enables an appropriate antenna channel, thereby reducing power consumption of an antenna system of the user terminal when a service requirement is met, and saving energy.

Embodiment 3

Figure 3:
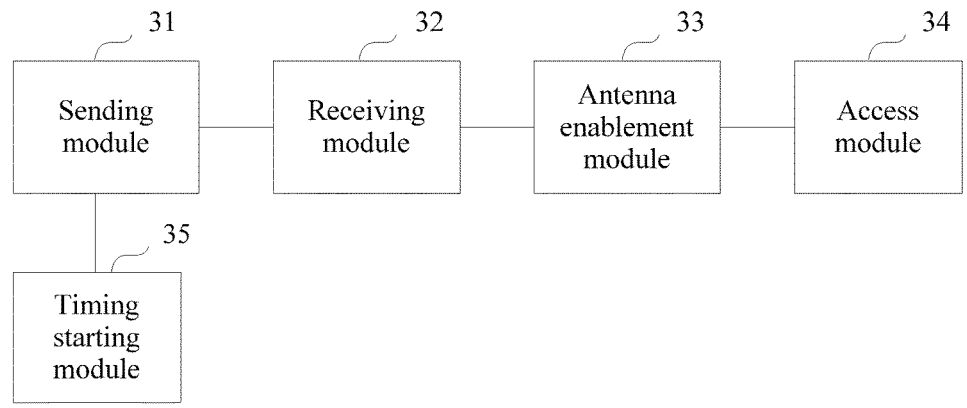
FIG. 3 is a schematic structural diagram of an access device according to Embodiment 3 of the present invention.

As shown in FIG. 3, FIG. 3 is a schematic structural diagram of an access device according to Embodiment 3 of the present invention. The access device may be a user terminal and includes a sending module 31, a receiving module 32, an antenna enablement module 33, and an access module 34.

The sending module 31 is configured to send a carrier extension request to a base station when a current service resource demand is greater than a specified threshold. The carrier extension request is used to request the base station to allocate an available spectrum resource.

The receiving module 32 is configured to receive the available spectrum resource sent by the base station.

The antenna enablement module 33 is configured to obtain through calculation, according to the current service resource demand and the available spectrum resource, a quantity of antenna channels that need to be enabled, and enable an antenna channel corresponding to the quantity of antenna channels.

The access module 34 is configured to send an access request to the base station. The access request carries the antenna channel that is to be enabled by the user terminal.

Specifically, the sending module 31 that determines the current service resource demand is specifically configured to: determine a service throughput rate of a current service in a specified period, where the service throughput rate is used to represent an amount of data transmitted between the user terminal and the base station per unit of time; and the sending module 31 that sends the carrier extension request to the base station is specifically configured to: send the carrier extension request to the base station when it is determined that the service throughput rate is greater than the specified threshold.

Specifically, the antenna enablement module 33 that obtains through calculation, according to the current service resource demand and the available spectrum resource, the quantity of antenna channels that need to be enabled is specifically configured to: obtain through calculation, according to the service throughput rate and a maximum bandwidth of the available spectrum resource, a minimum quantity of antenna channels that need to be enabled; and the antenna enablement module 33 that enables the antenna channel corresponding to the quantity of antenna channels is specifically configured to: enable the antenna channel according to the minimum quantity, obtained through calculation, of antenna channels that need to be enabled.

Optionally, the sending module 31 is further configured to send, by the user terminal, an available spectrum resource release request to the base station when the service is completed. The available spectrum resource release request is used to request the base station to release the allocated available spectrum resource.

Optionally, the access device further includes a timing starting module 35.

The timing starting module 35 is configured to start a timer when the current service resource demand is less than or equal to the specified threshold. The timer is used to trigger, when a specified time expires, the user terminal to determine whether to send the carrier extension request to the base station.

It should be noted that the access device in Embodiment 3 of the present invention may be a logical component integrated into the user terminal, or may be a network element independent of the user terminal, and may be implemented in a hardware manner, or may be implemented in a software manner. This is not limited herein.

The access device requests an available spectrum resource from a base station according to a current service resource demand, so that the base station performs resource scheduling with effectively reduced complexity, and resource scheduling becomes fairer. In addition, the access device obtains through calculation, according to the current service resource demand and a bandwidth of the available spectrum resource, a quantity of antenna channels that need to be enabled, and enables an appropriate antenna channel, thereby reducing power consumption of an antenna system of the access device when a service requirement is met, and saving energy.

Embodiment 4

Figure 4:
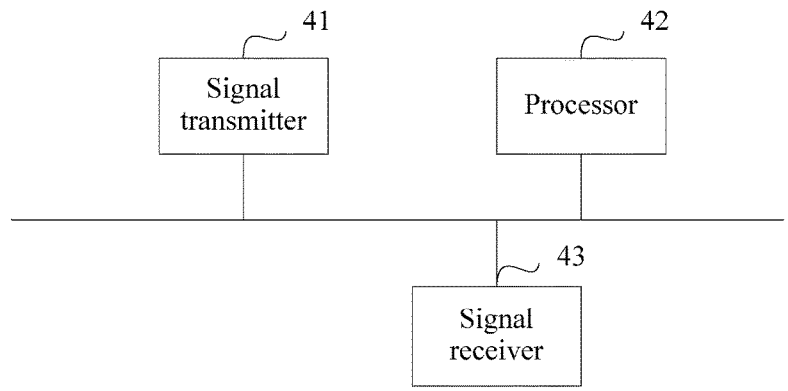
FIG. 4 is a schematic structural diagram of an access device according to Embodiment 4 of the present invention.

As shown in FIG. 4, FIG. 4 is a schematic structural diagram of an access device according to Embodiment 4 of the present invention. The access device includes a signal transmitter 41, a processor 42, and a signal receiver 43.

The signal transmitter 41 is configured to send a carrier extension request to a base station when a current service resource demand is greater than a specified threshold. The carrier extension request is used to request the base station to allocate an available spectrum resource.

The signal receiver 43 is configured to receive the available spectrum resource sent by the base station.

The processor 42 is configured to obtain through calculation, according to the current service resource demand and the available spectrum resource, a quantity of antenna channels that need to be enabled, and enable an antenna channel corresponding to the quantity of antenna channels.

The signal transmitter 41 is further configured to send an access request to the base station. The access request carries the antenna channel that is to be enabled by the user terminal.

Specifically, the processor 42 that determines the current service resource demand is specifically configured to: determine a service throughput rate of a current service in a specified period, where the service throughput rate is used to represent an amount of data transmitted between the user terminal and the base station per unit of time; and the signal transmitter 41 that sends the carrier extension request to the base station is specifically configured to: send the carrier extension request to the base station when it is determined that the service throughput rate is greater than the specified threshold.

Specifically, the processor 42 that obtains through calculation, according to the current service resource demand and the available spectrum resource, the quantity of antenna channels that need to be enabled is specifically configured to: obtain through calculation, according to the service throughput rate and a maximum bandwidth of the available spectrum resource, a minimum quantity of antenna channels that need to be enabled; and the processor 42 that enables the antenna channel corresponding to the quantity of antenna channels is specifically configured to: enable the antenna channel according to the minimum quantity, obtained through calculation, of antenna channels that need to be enabled.

Optionally, the signal transmitter 41 is further configured to: send an available spectrum resource release request to the base station when the service is completed, where the available spectrum resource release request is used to request the base station to release the allocated available spectrum resource.

Optionally, the processor 42 is further configured to: start a timer when the current service resource demand is less than or equal to the specified threshold, where the timer is used to trigger, when a specified time expires, the user terminal to determine whether to send the carrier extension request to the base station.

The processor 42 may be a general-purpose central processing unit (CPU), a microprocessor, an application-specific integrated circuit (ASIC), or one or more integrated circuits for controlling program execution in the solutions of the present invention.

The access device requests an available spectrum resource from a base station according to a current service resource demand, so that the base station performs resource scheduling with effectively reduced complexity, and resource scheduling becomes fairer. In addition, the access device obtains through calculation, according to the current service resource demand and a bandwidth of the available spectrum resource, a quantity of antenna channels that need to be enabled, and enables an appropriate antenna channel, thereby reducing power consumption of an antenna system of the access device when a service requirement is met, and saving energy.

Persons skilled in the art should understand that the embodiments of the present invention may be provided as a method, an apparatus (device), or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the apparatus (device), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Obviously, persons skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A method, comprising:
   determining, by a user terminal, a current service resource demand corresponding to a current service;
   comparing, by the user terminal, the current service resource demand to a specified threshold;
   in response to determining that the current service resource demand is less than the specified threshold, performing, by the user terminal, the current service using currently assigned resources; and
   in response to determining that the current service resource demand is greater than the specified threshold, performing the following:
      sending, by the user terminal, a carrier extension request to a base station, wherein the carrier extension request requests the base station to allocate an available spectrum resource;
      receiving, by the user terminal, the available spectrum resource sent by the base station;
      obtaining through calculation, by the user terminal according to the current service resource demand and the available spectrum resource, a quantity of antenna channels that need to be enabled, and enabling an antenna channel corresponding to the quantity of antenna channels; and
      sending, by the user terminal, an access request to the base station, wherein the access request indicates the antenna channel that is to be enabled by the user terminal.

2. The method according to claim 1, wherein determining the current service resource demand corresponding to the current service comprises:
   determining, by the user terminal, a service throughput rate of the current service in a specified period, wherein the service throughput rate represents an amount of data transmitted between the user terminal and the base station per unit of time; and
   wherein sending, by the user terminal, the carrier extension request to the base station comprises:
      sending, by the user terminal, the carrier extension request to the base station when the service throughput rate is greater than the specified threshold.

3. The method according to claim 2, further comprising:
   sending, by the user terminal, an available spectrum resource release request to the base station when the current service is completed, wherein the available spectrum resource release request requests the base station to release the allocated available spectrum resource.

4. The method according to claim 2, wherein the method further comprises:
   starting, by the user terminal, a timer when the current service resource demand is less than or equal to the specified threshold, wherein the timer triggers, when a specified time expires, the user terminal to determine whether to send the carrier extension request to the base station.

5. The method according to claim 2, wherein obtaining the quantity of antenna channels that need to be enabled comprises:
   obtaining through calculation, by the user terminal according to the service throughput rate and a maximum bandwidth of the available spectrum resource, a minimum quantity of antenna channels that need to be enabled; and
   wherein enabling the antenna channel corresponding to the quantity of antenna channels comprises:
      enabling, by the user terminal, the antenna channel according to the minimum quantity, obtained through calculation, of antenna channels that need to be enabled.

6. The method according to claim 5, further comprising:
   sending, by the user terminal, an available spectrum resource release request to the base station when the current service is completed, wherein the available spectrum resource release request requests the base station to release the allocated available spectrum resource.

7. The method according to claim 5, further comprising:
   starting, by the user terminal, a timer when the current service resource demand is less than or equal to the specified threshold, wherein the timer triggers, when a specified time expires, the user terminal to determine whether to send the carrier extension request to the base station.

8. The method according to claim 1, further comprising:
   sending, by the user terminal, an available spectrum resource release request to the base station when the current service is completed, wherein the available spectrum resource release request requests the base station to release the allocated available spectrum resource.

9. The method according to claim 8, further comprising:
starting, by the user terminal, a timer when the current service resource demand is less than or equal to the specified threshold, wherein the timer triggers, when a specified time expires, the user terminal to determine whether to send the carrier extension request to the base station.

10. The method according to claim 1, further comprising:
starting, by the user terminal, a timer when the current service resource demand is less than or equal to the specified threshold, wherein the timer triggers, when a specified time expires, the user terminal to determine whether to send the carrier extension request to the base station.

11. A device, comprising;
a signal transmitter;
a processor; and
a signal receiver;
wherein the processor is configured to:
    determine a current service resource demand corresponding to a current service;
    compare the current service resource demand to a specified threshold;
    in response to determining that the current service resource demand is less than the specified threshold, perform the current service using currently assigned resources; and
    in response to determining that the current service resource demand is greater than the specified threshold, perform the following:
    send, using the signal transmitter, a carrier extension request to a base station, wherein the carrier extension request requests the base station to allocate an available spectrum resource;
    receive, using the signal receiver, the available spectrum resource sent by the base station;
    obtain through calculation, according to the current service resource demand and the available spectrum resource, a quantity of antenna channels that need to be enabled, and to enable an antenna channel corresponding to the quantity of antenna channels; and
    send, using the signal transmitter, an access request to the base station, wherein the access request carries the antenna channel that is to be enabled by the device.

12. The device according to claim 11, wherein the processor being configured to determine the current service resource demand corresponding to a current service comprises the processor being configured to:
    determine a service throughput rate of the current service in a specified period, wherein the service throughput rate represents an amount of data transmitted between the device and the base station per unit of time; and
    wherein the processor being configured to send, using the signal transmitter, the carrier extension request to the base station comprises the signal transmitter being configured to:
    send the carrier extension request to the base station when it is determined that the service throughput rate is greater than the specified threshold.

13. The device according to claim 12, wherein the signal transmitter is further configured to:
    send an available spectrum resource release request to the base station when the current service is completed, wherein the available spectrum resource release request requests the base station to release the allocated available spectrum resource.

14. The device according to claim 12, wherein the processor is further configured to:
    start a timer when the current service resource demand is less than or equal to the specified threshold, wherein the timer triggers, when a specified time expires, the device to determine whether to send the carrier extension request to the base station.

15. The device according to claim 12, wherein processor being configured to obtain the quantity of antenna channels that need to be enabled comprises the processor being configured to:
    obtain through calculation, according to the service throughput rate and a maximum bandwidth of the available spectrum resource, a minimum quantity of antenna channels that need to be enabled; and
    wherein the processor being configured to enable the antenna channel corresponding to the quantity of antenna channels comprises the processor being configured to:
    enable the antenna channel according to the minimum quantity, obtained through calculation, of antenna channels that need to be enabled.

16. The device according to claim 15, wherein the signal transmitter is further configured to:
    send an available spectrum resource release request to the base station when the current service is completed, wherein the available spectrum resource release request requests the base station to release the allocated available spectrum resource.

17. The device according to claim 16, wherein the processor is further configured to:
    start a timer when the current service resource demand is less than or equal to the specified threshold, wherein the timer is used to trigger, when a specified time expires, the device to determine whether to send the carrier extension request to the base station.

18. The device according to claim 11, wherein the signal transmitter is further configured to:
    send an available spectrum resource release request to the base station when the current service is completed, wherein the available spectrum resource release requests the base station to release the allocated available spectrum resource.

19. The device according to claim 18, wherein the processor is further configured to:
    start a timer when the current service resource demand is less than or equal to the specified threshold, wherein the timer triggers, when a specified time expires, the device to determine whether to send the carrier extension request to the base station.

20. The device according to claim 11, wherein the processor is further configured to:
    start a timer when the current service resource demand is less than or equal to the specified threshold, wherein the timer triggers, when a specified time expires, the device to determine whether to send the carrier extension request to the base station.

* * * * *